Figure 1:
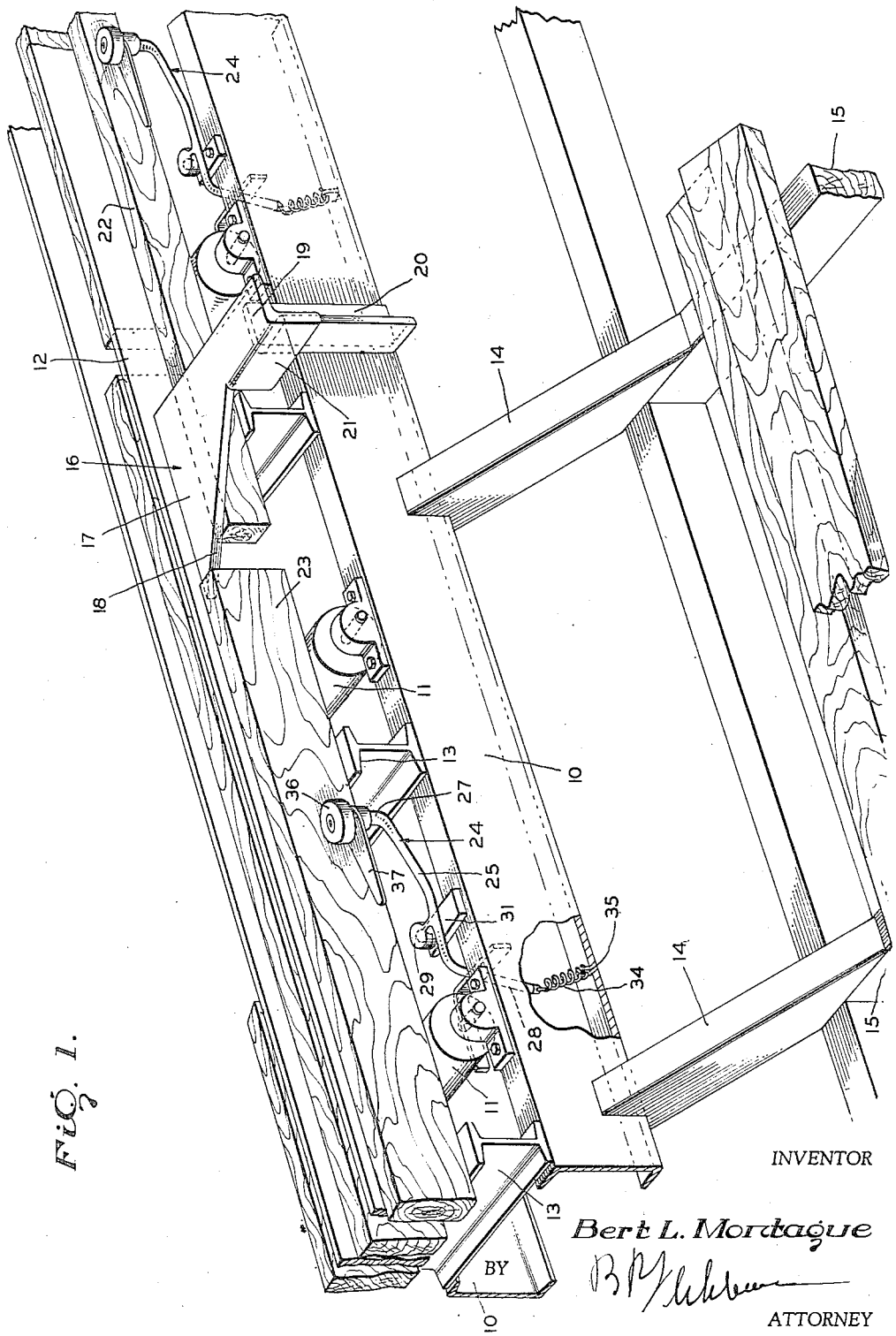

Jan. 28, 1958   B. L. MONTAGUE   2,821,301
LUMBER SORTING MACHINE
Filed Sept. 15, 1954   2 Sheets-Sheet 1

INVENTOR
Bert L. Montague
BY
ATTORNEY

Jan. 28, 1958  B. L. MONTAGUE  2,821,301
LUMBER SORTING MACHINE
Filed Sept. 15, 1954  2 Sheets-Sheet 2
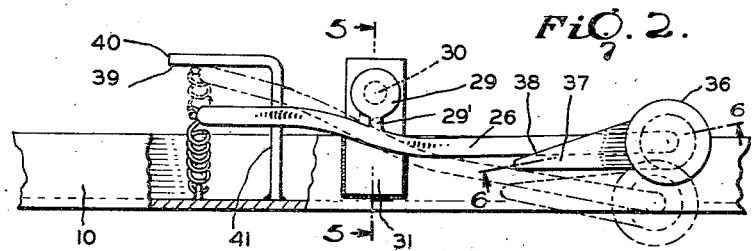
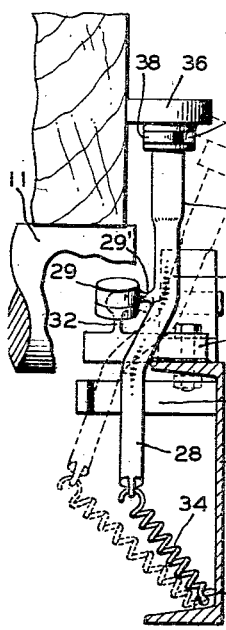
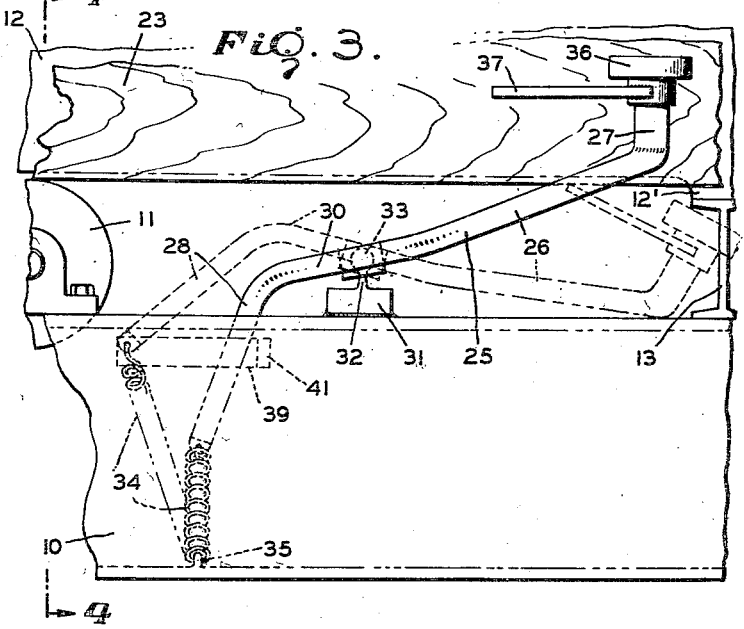
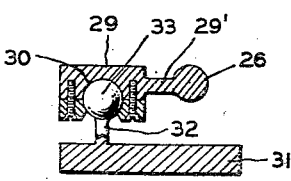
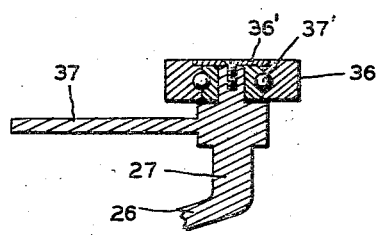
INVENTOR
Bert L. Montague.
BY
ATTORNEY United States Patent Office 2,821,301
Patented Jan. 28, 1958

2,821,301

LUMBER SORTING MACHINE

Bert L. Montague, Sumter, S. C., assignor to B. L. Montague Co., Inc., Sumter, S. C., a corporation of South Carolina Application September 15, 1954, Serial No. 456,212

4 Claims. (Cl. 209—90)

My invention relates to improvements in lumber sorting machines.

A primary object of the invention is to provide improved means for grading or sorting lumber in accordance with its thickness or width, and more particularly means for holding the lumber in place as it travels longitudinally of the machine and for ejecting or throwing off the lumber at predetermined collection stations along the machine.

A further object of the invention is to provide a universally movable holding device for the lumber passing through the machine which will maintain the lumber in proper contact with a longitudinal guide or separator plate of the machine until the lumber reaches a particular throw-off station, at which point the holding device will move clear of the lumber so that the lumber may be thrown off or ejected laterally without interference by the holding device.

Another object is to provide throw-off and holding means for a lumber sorting machine which coact in a novel manner for manipulating the lumber at the throw-off or collection stations for lumber of a given thickness and width.

A still further object is to provide holding and throw-off mechanism for a lumber sorter which is reliable and efficient in operation, rugged and durable, and inexpensive to manufacture.

Other objects and advantages of the invention will be apparent during the course of the following description.

In the accompanying drawings, forming a part of this application, and in which like numerals are employed to designate like parts throughout the same, Figure 1 is a fragmentary perspective view of a lumber sorter in accordance with the invention and having my improved holding and throw-off means, Figure 2 is a fragmentary plan view of the holding means, Figure 3 is a fragmentary side elevation of the same, Figure 4 is a fragmentary transverse vertical section taken substantially on line 4—4 of Figure 3, parts in section and parts broken away, Figure 5 is a vertical section taken on line 5—5 of Figure 2, and, Figure 6 is a vertical section taken on line 6—6 of Figure 2.

In the drawings, where for the purpose of illustration is shown a preferred embodiment of the invention, the numeral 10 designates a pair of main horizontal beams or support members forming the bed of the machine. Transverse horizontal rollers 11 are journaled for rotation upon the beams 10, as shown, and the rollers 11 are spaced apart uniformly throughout the length of the machine. The usual laterally spaced parallel longitudinal separator plates 12 for the lumber are provided, and these are suitably rigidly mounted upon longitudinally spaced horizontal transverse beams 13, in turn suitably rigidly mounted upon the tops of the beams 10, and extending therebetween. The rollers 11 project above the transverse beams 13, and the separator plates may have downwardly projecting extensions 12', which are rigidly secured to the beams 13.

As is well known, the parallel longitudinal separators 12 form longitudinal passages above the rollers 11 through which the lumber to be graded by the machine passes during its operation. The rollers 11 are power driven by conventional means, not shown and the machine may be built in substantially any desired length, and with the desired number of lumber passages or slots formed by the separator 12, although I have shown in Figure 1 only a fragmentary portion of the complete machine, in order to illustrate my improved holding and throw-off means which constitute the substance of the present invention.

As should be well known to those skilled in the art, the machine grades the lumber, according to length, width and thickness, although the present invention is concerned only with the grading or sorting of the lumber in accordance with width. The grading or sorting according to length and thickness is accomplished by placing the lumber at the forward end of the machine in the proper slots or passages between adjacent pairs of the separators 12, as is well known.

At spaced intervals along the lengths of the main beams 10, inclined ramp members 14 have their upper ends rigidly secured to the beams 10, somewhat below the rollers 11, and these ramp members extend downwardly, transversely of the machine for connection with transverse horizontal support members 15, which form a continuous horizontal table adjacent to the side of the machine for the collection of the lumber at the several throw-off stations where the lumber is graded according to thickness. In Figure 1, I have shown only a fragmentary portion of the collection table at one side of the machine, and it should be understood that a similar table, not shown, is provided at the other side of the machine, to facilitate collecting the lumber on opposite sides thereof, as is well known. The construction thus far is that of a conventional lumber grading or sorting machine, and I will now describe my improved holding and throw-off mechanism which constitutes the subject matter of the present invention.

At spaced intervals longitudinally of the machine, the throw-off or ejection units 16 in accordance with the invention, are provided, and each unit 16 establishes a point or station at which lumber of a certain thickness and width is ejected laterally from the roller bed and deposited upon the horizontal collection table formed by the members 15. Each unit 16 comprises a top horizontal plate or web 17, arranged at a pre-determined elevation above the rollers 11 and overlying the same, as shown. Each plate 17 has a leading diagonal edge 18 disposed in the path of travel of the lumber passing through the outermost slot or passage afforded by the outermost separator plate 12 at one side of the machine. A transverse horizontal plate extension 19 integral with the plate 17 projects outwardly thereof and over the adjacent main beam 10. A vertical mounting bracket 20 is rigidly secured by any suitable means to the outer side of the beam 10, and has its upper end rigidly secured to the plate extension 19, for rigidly supporting the same and the plate 17 at the desired elevation. Laterally outwardly of the diagonal edge 18, a depending vertical abutment plate 21 is rigidly secured to the plate extension 19 and bracket 20, and is preferably formed integral therewith. The abutment plate 21 is spaced laterally outwardly of the roller bed formed by the rollers 11 and laterally outwardly of the outermost passage or slot through which the lumber is traveling. As will be further described hereinafter, the elevation of the plate 17 is such that lumber of less than a predetermined width may pass freely under the plate 17 without striking the diagonal edge 18, and such lumber is shown at 22 in Figure 1. The lumber 23 of the proper width to be thrown off or ejected from the machine by the unit 16 will have its leading end strike the diagonal edge 18 of the plate 17 for forcing the lumber 23 laterally outwardly at its leading end. This lumber 23 will subsequently fall bodily from the roller bed and have its leading end strike the vertical abutment plate 21, and this will abruptly stop the forward movement of the lumber 23. Such lumber will then slide down the inclined ramp members 14 and deposit itself upon the table forming members 15 at the designated collection point.

Holding units 24 are provided at regularly spaced intervals along both sides of the machine for resiliently holding the lumber 22, 23 in the outermost passage or slot against the outermost separator plate 12, as the lumber advances longitudinally. Each holding unit 24 comprises an arm or bar 25, extending generally longitudinally of the machine and adapted to partake of limited universal movement, as will be further described. Each arm 25 includes a generally horizontal longitudinally extended portion 26, provided at its leading end with an upstanding vertical extension 27, preferably integral therewith, and projecting above the tops of the rollers 11. At its rear end, the arm 25 has a generally vertical depending extension 28 formed integral therewith, and arranged just inwardly of the adjacent beam 10 and terminating above the bottom of the beam, as shown. Intermediate its ends, the arm 25 has a short laterally inwardly projecting horizontal extension 29', carrying a casing 29 formed integral therewith, and provided in its bottom with a spherically curved recess 30 for a purpose to be described. Adjacent to the extension 29 and spaced below the same is a horizontal support plate 31, suitably rigidly secured to the top of the beam 10. Rigidly secured to the support plate 31 near its inner end is a short upstanding projection or pin 32, having a spherically rounded top end 33 for swivel engagement within the recess 30. The arm 25 is bodily mounted upon the pin 32, and universally movable upon the same.

A strong retractile coil spring 34 has its upper end secured to the lower end of the depending extension 28, and its lower end secured at 35 to the bottom of the beam 10. The spring 34 is arranged diagonally, as shown, for urging the depending extension 28 downwardly and laterally outwardly at all times. Accordingly, the leading end of the arm 25 and upstanding extension 27 are urged laterally inwardly toward the lumber 22, 23.

A ball roller 36 is suitably journaled upon the top of the upstanding extension 27, for contact with the outer longitudinal side of the lumber 22, 23. This roller 36 is held in place by a plate 36' and has ball bearings 37'. Rigidly and integrally secured to the extension 27, just below the roller 36 is a horizontal longitudinally extending tapered cam plate 37, projecting rearwardly of the roller 36 and disposed bodily outwardly of the inner face of the roller which contacts the lumber. The inner side or edge 38 of the cam plate is arranged slightly diagonally or at an angle to the longitudinal path of travel of the lumber, so that each section of lumber advancing through the machine will first engage the cam plate 37 and be guided into smooth engagement with the roller 36. The cam plate 37 and roller 36 are disposed at a proper elevation above the roller bed of the machine to engage the outer side of the lumber.

The purpose of the holding devices 24 is to resiliently hold the lumber 22, 23 in firm sliding engagement with the outer faces of the separator plates 12, while the lumber advances longitudinally through the machine. When the lumber 23 reaches its ejection station established by the particular throw-off unit 16, and strikes the diagonal edge 18 of such unit, the holding unit 24 must yield and ultimately move out of the path of travel of the lumber 23 as it is ejected laterally during the sorting operation.

When the leading end of the lumber 23 begins to move outwardly along the diagonal edge 18 and toward the abutment plate 21, the arm 25 will first swing outwardly in a horizontal plane as indicated in broken lines in Figure 2. The extent of horizontal swinging movement of the arm 25 will be positively limited by an L-shaped horizontal bracket or stop 39, rigidly secured to the inner side of the beam 10, at the rear of the plate 31, and beneath the rollers 11. The depending extension 28 is disposed inside of the L-shaped bracket 39, as shown, and when this extension contacts the longitudinal portion 40 of the L-shaped bracket 39, the arm 25 cannot swing horizontally outwardly any further, as caused by the lateral movement of the lumber. However, as the lumber passes over the full length of the diagonal edge 18, and is thereby ejected horizontally from the rollers 11, it will ultimately fall bodily from the roller bed and strike the vertical abutment plate 21 and slide down the ramp members 14 to the table forming members 15. To permit this, without interference, the unit 24 must shift downwardly to allow the lumber 23 to pass from the roller bed. The arm 25 having now reached the outermost extent of its horizontal swing will shift downwardly under the weight of the lumber to approximately the position shown in broken lines in Figure 3. The spring 34 will yield to permit this movement of the arm 25. The lumber 23 may now topple over the unit 24 without interference therefrom and engage the abutment plate 21 and the ramp members 14. The above described horizontal and vertical swinging movement of the unit 24 is caused entirely by the movement of the lumber 23 as it is ejected laterally from the machine by the unit 16.

As soon as the lumber 23 passes over the unit 24 and down the ramp members 14, the spring 34 will automatically return the unit 24 to its normal elevated position. The depending extension 28 will be drawn by the spring downwardly until the extension 28 contacts the transverse portion 41 of the L-shaped bracket 39, which serves as a stop to limit the downward movement of the extension 28. Correspondingly, the bracket 39 coacts with the spring and extension 28 to hold the roller 36 in the proper elevated position for engagement with the outer side of the next section of lumber advancing through the machine. Inward lateral movement of the roller 36 and outward lateral movement of the extension 28 under the influence of spring 34 will cause contact of the cam plate 37 and roller 36 with the next section of lumber advancing through the machine. The roller 36 will never move laterally inwardly beyond the point for smooth engagement of the cam plate 37 with the leading end of the next section of lumber, since the depending extension 28 will always engage the inner side of the adjacent beam 10 first, to prevent this as best shown in Figures 3 and 4.

It is thus seen that the holding unit 24 is mounted for limited universal movement upon the upstanding element 32, and this movement of the unit 24 is caused by the movement of the lumber as it is ejected laterally from the machine by the throw-off unit 16. The L-shaped bracket 39 serves to limit the outward horizontal swinging movement of the arm 25, and also the downward vertical swinging movement of the extension 28, and consequently the upward movement of the roller 36. The inward horizontal swinging movement of the roller 36 will be limited by contact of the extension 28 with the inside of the beam 10.

It should be understood that more than one of the units 24 may contact a single section of lumber throughout its length, and such being the case, the operation of all of the units 24 contacting the lumber will be more or less identical with that described above in connection with a single unit 24, as the lumber is ejected laterally from the machine.

It should also be understood that the plates 17 of successive units 16 along the machine are arranged at successively lower or higher elevations, to eject lumber of lesser or greater width at the designated sorting stations.

The units 24 are also arranged at a lower or higher elevation according to the width of the lumber. As previously stated, the units 16 and 24 are arranged at both sides of the machine, so that the lumber may be sorted according to width and/or thickness along both sides of the machine. Any desired number of the units 16 and 24 may be employed upon the machine, and the spacing of these units will be determined in accordance with the known lengths of the lumber to be handled by the machine.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. In a lumber sorting machine, means to support the lumber and to move the same longitudinally, a throw-off unit having a diagonal part to be engaged by the leading end of the lumber for shifting the lumber laterally outwardly toward a collection point, an element to be engaged by the leading end of the lumber as it is shifted laterally outwardly to stop the forward movement of the lumber, and resilient holding means engaging the side of the lumber as it moves longitudinally of the machine and adapted to move outwardly and downwardly to a position clear of the lumber as the lumber moves laterally outwardly upon engaging said diagonal part, the lumber effecting said outward and downward movement of the resilient holding means, said holding means returning automatically to its normal position.

2. In a lumber sorting machine, a device for opposing the lateral movement of the lumber while traveling longitudinally through the machine, said device comprising an arm, universal pivotal supporting means connected with the arm, a roller connected with one end of the arm to contact with the outer face of the lumber, a cam plate rigidly connected with the arm near the roller and having an inclined face to engage the outer face of the lumber and guide the same to the roller, and means to oppose the universal swinging movement of the arm including a spring.

3. In a lumber sorting machine, means to support the lumber and to convey it longitudinally, a diagonal element arranged in the path of travel of the lumber and engaging the leading end of the lumber to deflect it laterally, an arm arranged to engage the outer side of the lumber for opposing its lateral movement, ball and socket means supporting said arm and allowing it to have universal swinging movement under the influence of the lumber being deflected laterally, a depending extension on said arm, a retractile spring secured to said extension and opposing horizontal and vertical swinging movement of the arm in one pair of directions, and a generally L-shaped stop element fixedly mounted with respect to the arm and having one side to engage said extension for limiting horizontal swinging of the arm in one direction and a second side to engage the extension for limiting vertical swinging of the arm in one direction.

4. A lumber sorting machine, comprising a support, means mounted upon the support for supporting the lumber and holding the side faces of the lumber vertical and to feed the lumber longitudinally, said holding and feeding means having a recess extending to the top of the same, a lumber guide element arranged near and extending above the holding and feeding means and having a vertical face to contact with one vertical side face of the lumber, a stationary deflecting element arranged above the holding and feeding means at a selected spaced elevation from the holding and feeding means, said stationary deflecting element having a horizontally inclined face extending transversely of the holding and feeding means, said inclined face contacting with the lumber having a vertical dimension which will prevent the lumber passing under the deflecting element, a lumber engaging element arranged within said recess, means for pivotally supporting the lumber engaging element within the recess so that its free end may be swung both horizontally and vertically and the free end moved wholly beneath the top of the holding and feeding means and wholly beneath the lumber, and a spring connected with the pivoted lumber engaging element and serving to raise the free end of the pivoted lumber engaging element to a point above the recess and into contact with the adjacent vertical side face of the lumber, the spring yielding to permit the free end of the pivoted lumber engaging element being moved by the lumber horizontally outwardly from the guide element and then vertically downwardly to be positioned wholly beneath the top of the holding and feeding means and wholly beneath the lumber.

References Cited in the file of this patent

UNITED STATES PATENTS

| | | |
|---|---|---|
| 103,677 | Stilwell | May 31, 1870 |
| 674,455 | Comly | May 21, 1901 |
| 707,951 | Alexander | Aug. 26, 1902 |
| 1,112,727 | Smith | Oct. 6, 1914 |
| 1,154,814 | Smith | Sept. 28, 1915 |
| 1,298,510 | Kaas | Mar. 25, 1919 |
| 1,986,427 | Denton | Jan. 1, 1935 |
| 2,369,557 | Gettelman | Feb. 13, 1945 |
| 2,600,147 | Wilson | June 10, 1952 |
| 2,722,247 | Schroeder et al. | Nov. 1, 1955 |

FOREIGN PATENTS

| | | |
|---|---|---|
| 886,720 | Germany | Oct. 19, 1953 |